J. PETROVITCH.
AIRPLANE WING.
APPLICATION FILED DEC. 18, 1919.
1,353,179.
Patented Sept. 21, 1920.
2 SHEETS—SHEET 2.
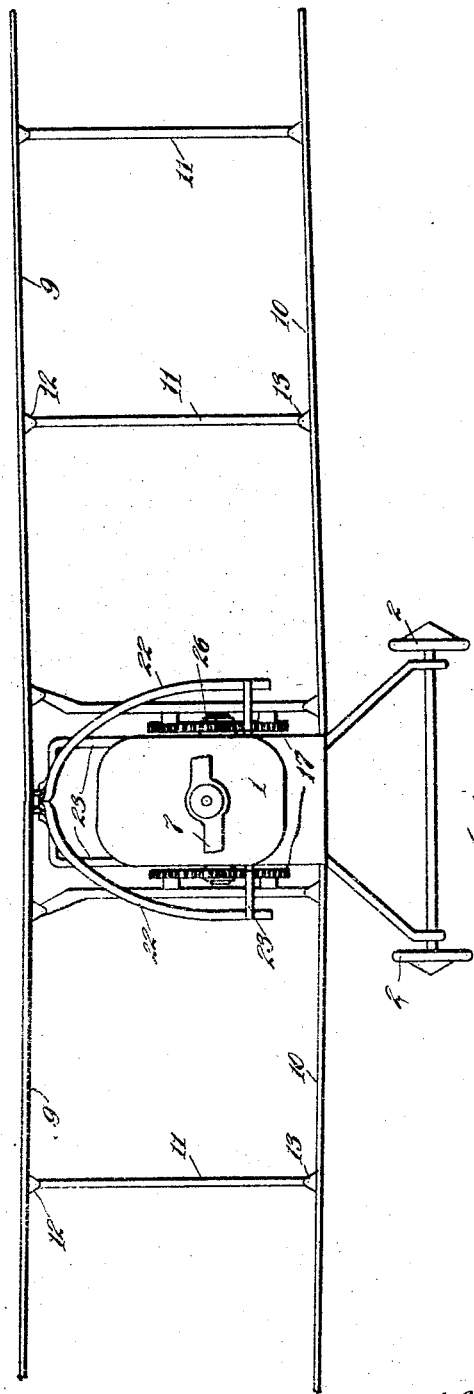
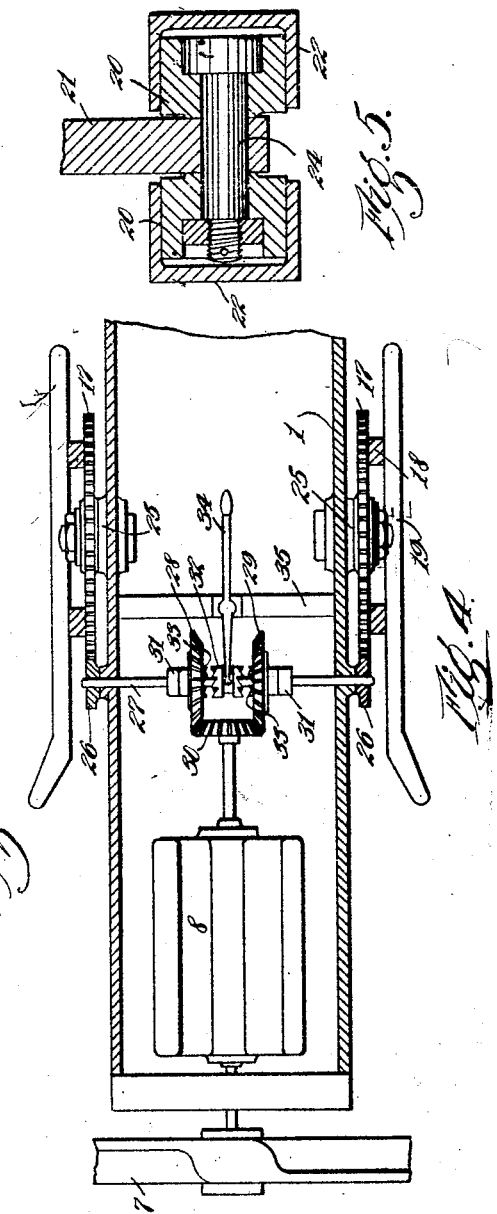

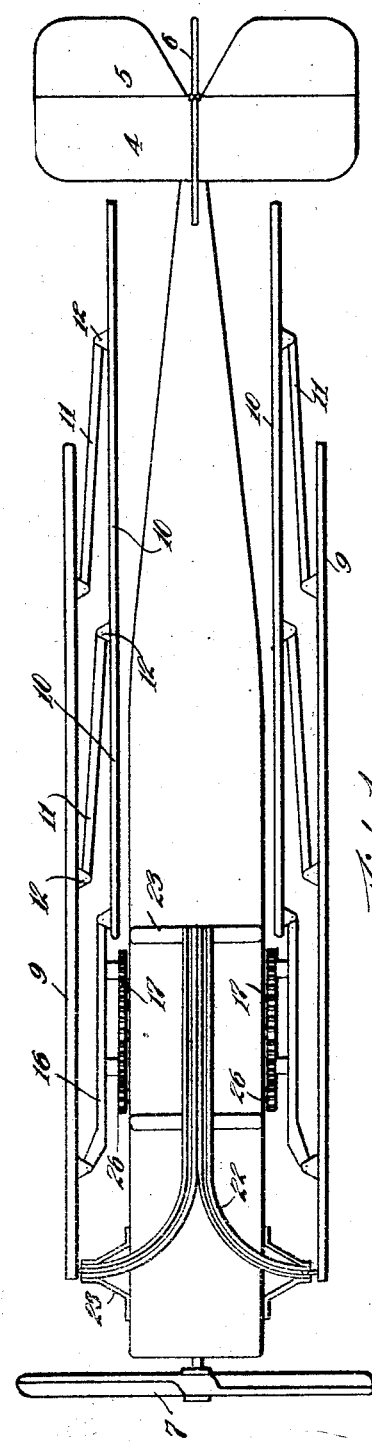

UNITED STATES PATENT OFFICE.

JOHN PETROVITCH, OF CLEVELAND, OHIO.

AIRPLANE-WING.

1,353,179. Specification of Letters Patent. Patented Sept. 21, 1920.

Application filed December 18, 1919. Serial No. 345,793.

*To all whom it may concern:*

Be it known that I, JOHN PETROVITCH, a citizen of the United States, residing at Cleveland, in the county of Cuyahoga and State of Ohio, have invented certain new and useful Improvements in Airplane-Wings, of which the following is a specification.

This invention relates to a new and novel construction in the wings or planes for airplanes, and it has for its object to provide a construction whereby the said wings may be mechanically folded in a plane parallel to that of the fuselage so that the air-plane may be driven in congested districts and may be conveniently housed.

A further object of the invention is the provision of means whereby the driving mechanism for driving the said planes may be embodied in the power plant of the vehicle.

Further objects of the invention are in the provision of mechanical means for reversing the operation of the planes, and more limited objects of the invention are in part obvious and in part will appear hereafter.

The invention comprises the construction and combination of parts hereinafter described and claimed.

Referring particularly to the drawings wherein like reference numerals designate similar parts of reference throughout the various views Figure 1 is a plan view of the vehicle, showing the wings in a folded position; Fig. 2 is a side elevation, the outside wing being partially broken away to more clearly illustrate the construction of the struts; Fig. 3 is a front elevation of the vehicle, the wings being shown in an open or flying position; Fig. 4 is a horizontal section through the forward part of the fuselage showing the driving motor and its associated gearing for driving the wings, and Fig. 5 is a sectional detail showing the manner in which the wings are secured to a substantially circular track to be hereinafter described.

As illustrated the invention comprises the customary fuselage 1 mounted at its forward end upon the usual landing wheels 2 and provided at its rearward end with a skid 3. The fuselage is also provided with the customary tail and elevating planes 4 and 5 and with a rudder 6 at this end. A propeller 7 is placed in the forward part of the fuselage and has driving connection with the motor 8, and the fuselage has secured to it the upper and lower planes 9 and 10 which are kept in a parallel relation to each other by struts 11.

The foregoing parts are of a standard construction and will therefore require no further description, it being understood that the particular construction of parts pertaining strictly to this invention may be applied to numerous types of air-planes.

To allow the wings to fold in a compact manner and parallel to the sides of the fuselage struts 11 hereinbefore referred to are hinged to the upper and lower planes at 12 and 13. The particular type of hinge employed will depend entirely upon the use to which the plane is intended to be put and may be of any design and they are therefore shown in this instance as consisting of two ears 14 which are secured to the planes and have pivoted between them the reduced ends 15 of the struts 11. The ends of the planes which are adjacent to the fuselage, when the planes are in an extended or flying position, are secured to a frame 16 which has driving connection with a large gear 17. This frame 16 is shown most clearly in Fig. 2 and comprises two vertical portions 18 having secured at their ends horizontal struts 19. The struts 19 are hinged to the ends of the wings 10 in identically the same manner as the struts 11 as hereinbefore described.

It is obvious that in order to open the planes for use the ends of the planes must necessarily be guided to assume a position substantially at right angles to the position they are in in Fig. 1, and to provide for this rollers 20 are secured to the aforesaid planes by means of a bracket 21 secured thereto in any convenient manner and are guided within arcuate tracks 22. The tracks 22 are supported upon each side of the forward part of the fuselage and at their upper and lower ends by arms 23 which are rigidly fastened to the fuselage and in cross section appear as to channel irons having their open faces presented to each other, and having confined between their horizontal webs the rollers 20, said rollers being mounted upon an axle 24 carried by the bracket 21. These tracks, due to their peculiar form provide a means for positively guiding the ends of the wings when assuming the flying position and also tend to act as a locking point to provide stability for said wings when the same are in an open or flying position.

The wings are mechanically operated through the gears 17 hereinbefore referred to and which are pivoted upon suitable bearings 25 formed as a part of the fuselage and have meshing with them driving pinions 26 keyed or otherwise fixed to a shaft 27 which is also mounted in bearings upon the fuselage and extends through each side thereof. This shaft 27 has loosely mounted thereon a pair of bevel gears 28 and 29 which are driven through a bevel gear 30 fixed to the extended crank shaft of the motor. The gears 28 and 29 being loosely mounted upon the shaft 27 are prevented from becoming displaced with respect to the driving gear 30 by collars 31 fixed permanently to the shaft, and the construction shown is such that by securing the two gears 28 and 29 alternately against rotation upon the shaft 27 the wings 9 and 10 may be alternately raised or lowered. This construction comprises a shifting clutch 32 which is splined upon the shaft 27 intermediate of the gears 28 and 29. Said gears have upon their innermost faces clutch teeth 33 which are adapted to mesh with the clutch 32 when the same is shifted by a lever 34 fixed to any convenient part of the fuselage, as for instance, one of the cross stays indicated at 35. The lever 34 being provided with a forked end which straddles the clutch member 32. The foregoing description of driving mechanism is only typical of the numerous mechanism which may be employed for this purpose and I therefore do not wish to limit myself in the construction and combination of parts further than is required by the state of the art or that which comes within the scope of the appended claims.

I claim:

1. The combination with an air-plane body, of upper and lower wings pivotally connected thereto and to each other to fold flatly beside the sides of the body, the pivoted connection to the body being rotatable as a whole to swing the wings to ordinary horizontal position when in use.

2. The combination with an air-plane body, of a rotary frame mounted on each side of the body, on an axis transverse to said body, upper and lower folding wings pivotally connected to said frames, and struts pivotally connected between said wings.

3. The combination with an air-plane body, of a rotary frame mounted on each side of the body, on an axis transverse to said body and upper and lower folding wings pivotally connected to said frames, the body being also provided with guides engaged by the inner ends of the upper wings, to swing the wings from horizontal to vertical position as they are folded.

4. The combination with an air-plane body, of a rotary frame mounted on each side of the body, on an axis transverse to said body and folding wings pivotally connected to said frames, and a power device geared to said frames to rotate the same.

5. The combination with an air-plane body, of a pair of upper and lower wings at each side thereof, pivoted struts between the wings, a rotary frame mounted on a transverse axis at each side of the body and fixed to the struts at the inner ends of the wings, and means to guide the wings from open horizontal to folded vertical position, or vice versa, when the frames are rotated.

6. The combination with an air-plane body, of a rotary frame mounted on each side of the body, on an axis transverse to said body and folding wings pivotally connected to said frames, the body being provided with curved guide bars extending from the sides of the body to position above the same, and the wings having rollers engaging said bars to turn the wings to horizontal or vertical position as the frames are rotated one way or the other.

In testimony whereof, I do affix my signature in presence of two witnesses.

JOHN PETROVITCH.

Witnesses:
LEO E. CARROLL,
RUDOLPH HAWLIK.